United States Patent [19]

Nishimoto

[11] 4,136,946
[45] Jan. 30, 1979

[54] PHOTOGRAPHIC PRINTER AND ASSOCIATED PROCESSOR

[75] Inventor: Kanichi Nishimoto, Wakayama, Japan

[73] Assignee: Noritsu Koki Co., Ltd., Wakayama, Japan

[21] Appl. No.: 860,890

[22] Filed: Dec. 15, 1977

[30] Foreign Application Priority Data

Dec. 28, 1976 [JP] Japan .................. 51-175300[U]

[51] Int. Cl.² .............................................. G03B 29/00
[52] U.S. Cl. .................................... 355/28; 355/16
[58] Field of Search ................. 355/13, 16, 27–29

[56] References Cited

U.S. PATENT DOCUMENTS

| 3,557,675 | 1/1971 | Koll et al. ................... 355/28 X |
| 3,741,651 | 6/1973 | Nishiyama et al. ........... 355/28 X |
| 3,756,488 | 9/1973 | Van Megen et al. .......... 355/16 UX |
| 3,871,763 | 3/1975 | Schrempp ..................... 355/16 |
| 3,926,625 | 12/1975 | van der Sterren ............. 355/16 X |
| 3,998,542 | 12/1976 | Toto et al. .................... 355/16 |
| 4,068,937 | 1/1978 | Willemse et al. ............. 355/16 X |
| 4,077,713 | 3/1978 | Vercoulen ..................... 355/16 |

Primary Examiner—Richard A. Wintercorn
Attorney, Agent, or Firm—Lane, Aitken & Ziems

[57] ABSTRACT

A photographic printer associated with a photographic processing apparatus is provided with an accumulator which receives from the printer element a roll of exposed photographic paper in naturally-formed random loops. A movable, biased plate supports the loops of paper, and position switches respond to the movement of the plate, which is a function of the length of the paper loops within the accumulator, to selectively control different operations performed within the printer to control and regulate the speed of the printer in accordance with the operational speed of other units of the processing apparatus, such as a photographic print developing unit.

7 Claims, 3 Drawing Figures

PHOTOGRAPHIC PRINTER AND ASSOCIATED PROCESSOR

BACKGROUND OF THE INVENTION

This invention provides an improvement in a printer in which a long photographic paper wound in a roll form is supplied for printing, then cut to a size corresponding to a frame of a film after printing for additional processing and fed as a sheet-form photographic paper, and more particularly, this invention provides a printer, a feeding device for feeding sheet-form photographic paper to be forwarded from the printer, and an automatic developing device arranged in this order to form a photographic processing machine which performs a series of processing operations, including printing and developing the photographic paper, in which the printer includes an improved photographic paper accumulator stores the photographic paper printed in said printer and operates to adjust for the difference between the time required for the printing operation in the printer and the time required for the development operation in the automatic developing device.

A conventional automatic photographic processing machine which has been widely used includes a printer provided with a photographic paper accumulator in which a long photographic paper wound in a roll form and mounted in a photographic paper pay-out member arranged at one side in a housing mounted on a machine frame is paid out intermittently for a desired length, and then after printing thereof, is cut to a size corresponding to a frame of a film, in response to the time required for performing an after-treatment, such as a developing treatment, and feeds the cut separate sheet-form photographic paper one by one; a feeding device for receiving the individual sheet-form photographic paper forwarded from this printer and feeding the paper one-by-one to an automatic developing device; and an automatic developing device for applying a developing treatment on the sheet-form photographic paper fed by the feeding device. A photographic paper accumulator used with such automatic photographic processing machine have been constructed as having a casing fixed to the housing of the printer and provided with an opening at the top thereof for receiving and supplying the photographic paper; a group of upper photographic paper guide rollers formed such that the rollers for guiding the photographic paper are rotatably mounted at a plurality of stationary shafts positioned at the upper part of the casing, the axes of the guide rollers being at right angles with respect to the transfer direction of the photographic paper and which are arranged in a row spaced apart in the transferring direction; a group of lower photographic paper guide rollers formed such that they are positioned below the group of upper photographic paper guide rollers in the casing, with some of the rotatable lower guide rollers arranged in a supporting member which may be moved up and down along guide rails, in a staggered fashion with respect to each of the rollers forming the group of upper photographic paper guide rollers; an upper limit switch for use in sensing when the group of lower photographic paper guide rollers have reached the lowermost position to terminate the intermittent pay-out operation of the photographic paper from the photographic paper pay-out member, or a printing operation for the photographic paper, etc.; and a lower limit switch for sensing when the group of lower photographic paper guide rollers have reached an upper position limit to terminate an intermittent pull-out operation of the photographic paper from the photographic paper accumulator, or a cutting operation for cutting the photographic paper to a size corresponding to a frame of a film, etc.

The roll of photographic paper is subjected to strains which tend to curl the paper, due to the fact that it is forcibly curved, pulled out and guided in zig-zag form by each of the upper rollers of the group of the upper photographic paper guide rollers and each of the lower rollers of the group of the lower photographic paper guide rollers. In this way, when the strained photographic paper is cut to a size corresponding to a frame of a film, it will become curled, resulting in some zig-zag movement which will present obstruction problems in conveying the photographic paper through the automatic developing device. The curled photographic paper will also make the developing treatment difficult resulting in poor development.

When a roll of photographic paper is newly installed, it will present unavoidable problems such as troublesome installation of the photographic paper over both upper and lower groups of guide rollers, and the length of the photographic paper required for its installation is long resulting in some loss in the photographic paper.

SUMMARY OF THE INVENTION

It is a principal object of the present invention to provide a printer provided with a photographic paper accumulator which will not cause any curl-forming strain in the photographic paper and which exhibit remarkable effectiveness when installed in a photographic processing machine for automatically performing a series of treatments, from printing the photographic paper to a developing treatment, on a long photographic paper wound in a roll form.

It is another object of the present invention to provide a simply constructed printer which will provide easy installation of a photographic paper, particularly when installed in a photographic processing machine for automatically performing a series of treatments, from printing the photographic paper to a developing treatment, on a long photographic paper wound in a roll form.

It is still another object of the present invention to provide a printer which will make good use of photographic paper, particularly when installed in a photographic processing machine for automatically performing a series of treatments, from printing the photographic paper to a developing treatment, on a long photographic paper wound in a roll form.

Other objects and features of the present invention will become apparent from the following description in reference to the accompanying drawings.

BRIEF DESCRIPTION OF THE DRAWINGS

The drawings provide an easy understanding of a preferred embodiment of a printer constructed in accordance with this invention, with the printer, a feeding device for receiving a separate sheet-form photographic paper cut in the printer to a size corresponding to a frame of a film after printing and forwarding the cut paper for subsequent processing and an automatic developing device arranged in this order and installed in a photographic processing machine for automatically performing a series of processing operations, from printing the photographic paper to developing. In the drawings, substantial structural members which may be easily understood and designed by those skilled in the art to which this invention belongs, have not been shown.

DESCRIPTION OF THE PREFERRED EMBODIMENT

Figure 1:
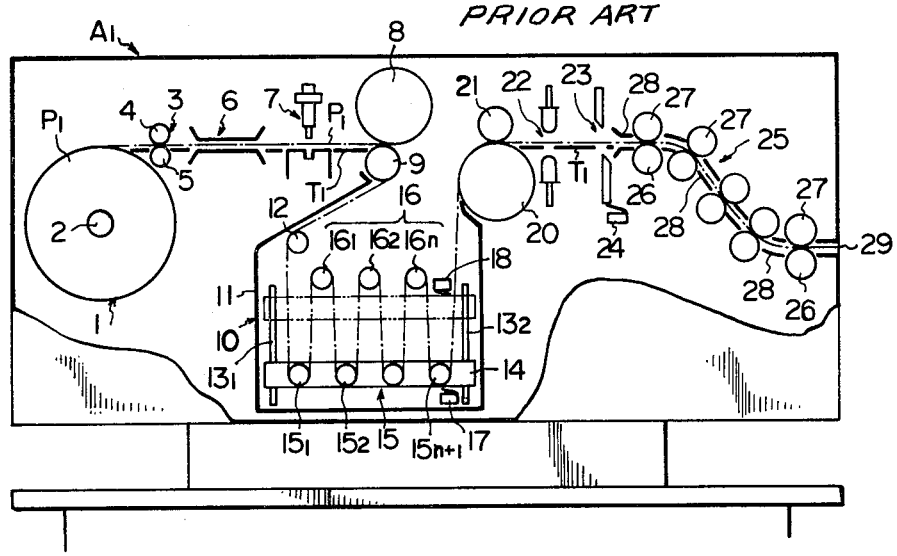
FIG. 1 is a diagramatic view illustrating an accumulator for storing a photographic paper printed at a printing member of the printer, showing only a printer installed in a conventional photographic processing machine and as seen in a direction at right angle to the direction in which a long photographic paper wound in a roll form is intermittenlly fed from a photographic paper pay-out member installed at one side in the housing in the printer.

FIG. 1 is utilized for mainly illustrating an accumulator for storing a photographic paper printed at a printing member in a prior art print showing the printer installed in a known, conventional photographic processing machine in which a series of processing operations for printing the photographic paper to developing are automatically performed. FIG. 1 is viewed in the direction at right to the direction in which a long photographic paper wound in a roll form and charged at the photographic paper pay-out member arranged at one side in the casing of the printer is intermittently forwarded a desired length.

In FIG. 1, $A_1$ is a printer, 1 is a charging member for a long photographic paper $P_1$ wound in a roll form, 2 is a charging shaft, 4 and 5 are pay-out rollers for paying out the photographic paper $P_1$ from the charging member 1 to a desired length by intermittent rotations thereof. One of the rollers is connected to a driving member (not shown), and both are resiliently contacted with the photographic paper, and these two rollers 4 and 5 form a pay-out member 3 for paying out the photographic paper $P_1$ to a desired length. 6 is a printing member, and a light source of which illustration is eliminated since it may be of a well-known type is positioned below the printing member. To perform a printing, the light source exposes from beneath the photographic paper $P_1$ forwarded with its sensitive surface faced downward when the pay-out rollers 4 and 5 are stopped. 7 is a punch member which is operated in cooperation with a printing operation at the printing member 6 and makes a hole either at the upper edge or the lower edge of the photographic paper $P_1$ after completion of the printing. The position in which the punching member 7 is installed is already set at such location as a hole is to be made between the printing positions in front and in the rear. 8 is a photographic paper tension roller which is always rotated, 9 is an idler roller which is resiliently contacted with said photographic tension roller 8 by a well-known means, and these two rollers 8 and 9 always keep the photographic paper $P_1$ under tension. $T_1$ is a base plate provided with a guide passage (not shown) for transferring the photographic paper $P_1$.

10 indicates a known photographic paper accumulator which is comprised, as major components, of a casing 11, a guide roller 12 installed in the casing 11, vertical guide rods $13_1$ and $13_2$ arranged similarly at both sides in the casing 11, and a group of lower photographic paper guide rollers 15 which may be moved vertically as a group along the guide rods $13_1$ and $13_2$, each of the rollers $15_1$, $15_2$ ... $15_{n+1}$ for guiding the photographic paper $P_1$ being arranged on a roller supporting plate 14 in spaced apart relation. A group of upper photographic paper guide rollers 16, which are formed by rollers $16_1$, $16_2$ ... $16_n$ is located at the upper part of the casing 11, with each roller being rotatably mounted at an upper position which is staggered to between each of the rollers $15_1$, $15_2$ ... $15_{n+1}$ of the group of said lower photographic paper guide rollers 15. The accumulator 10 also has an upper limit switch 17 for terminating a pay-out operation of the pay-out rollers 4 and 5 at said pay-out member 3, a printing operation at the printing member 6 and a punching operation at the punching member 7, only when said roller supporting plate 14 has descended and contacted therewith, and for restarting a forwarding of the photographic paper when the roller supporting plate 14 has moved upwardly therefrom, and a lower limit switch 18 for terminating a take-out operation of a photographic paper take-out roller 20, to be described later, only when said roller supporting plate 14 has been raised to contact therewith, and for restarting a forwarding of the photographic paper when the roller supporting plate is moved away therefrom. In the present case, a sensing operation at a punch hole sensing member 22 and a cutting operation at a photographic paper cutting member 23 are also inevitably terminated.

20 is a photographic paper take-out roller for taking out the photographic paper $P_1$ from inside the casing 10 in the same length as fed in by the pay-out rollers 4 and 5 at said pay-out member 3 but at a speed lower than that of the forwarding so as to fit a developing treatment time, and 21 is an idler roller which is resiliently contacted with said roller 20 by a well-known means not shown. 22 is a punched hole sensing member, and 23 is a photographic paper cutting member for cutting the photographic paper $P_1$ to a size corresponding to a frame of a film, which has upper and lower cutters. 24 is a limit switch for sending a signal when the cutters at the photographic paper cutting member 23 have cut the photographic paper $P_1$ and returned to their original positions. The photographic paper take-out roller 20 is constructed such that it is driven for a specified period of time by a conventional stepping motor, etc., which may be operated by a signal from the limit switch 24 and, as described above, terminated in its operation by the lower limit switch 18 and also terminated by a sensed signal from the punched hole sensing member 22. The photographic paper cutting member 23 is operated once every time the punched hole sensing member 22 senses a hole during a time in which the photographic paper take-out roller 20 terminates a take-out operation for the photographic paper $P_1$, to perform a cutting operation for cutting the photographic paper $P_1$ to a size corresponding to a frame of a film.

25 is a photographic paper forwarding member for forwarding the photographic paper $P_1$ cut to a size corresponding to a frame of a film, and this member is comprised of a plurality of rollers 26 operatively connected to a conventional driving part not shown, a plurality of rollers 27 which are resiliently contacted with the rollers 26, and upper and lower guide plates 28 arranged between each of the pairs of the rollers 26, 27, and 29 is a forwarding opening provided in the printer housing.

With the conventional photographic accumulator in a printer provided in a printer constructed as described above, the roll of photographic paper $P_1$ is applied alternatively over each of the rollers $16_1, 16_2, \ldots 16_n$ in the group of upper photographic paper guide rollers 16 and each of the rollers $15_1, 15_2, \ldots 15_{n+1}$ in the group of lower photographic paper guide rollers 15, forcedly curved, pulled out and guided in zig-zag form. As described above, this torturous passage of the photographic paper $P_1$ through the printer produces stresses in the paper, which results in strains that tend to curl the paper after it has been cut. The curling of the paper makes execution of the developing treatment difficult, causes poor print development. Furthermore, a troublesome operation is required when the photographic paper $P_1$ is applied over the groups of upper and lower photographic paper guide rollers.

Figure 2:
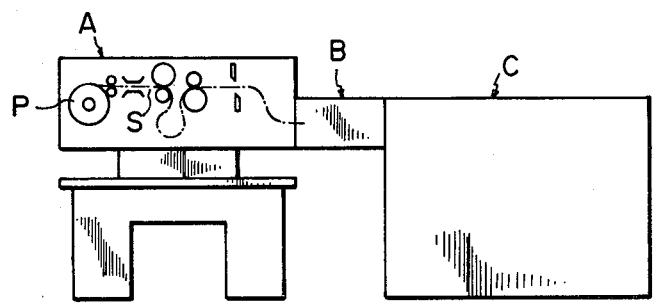
FIG. 2 is a diagramatic view showing the general arrangement of each of the devices of a photographic processing machine into which a printer of the present invention is installed, as seen in the same direction as that shown in FIG. 1.
Figure 3:
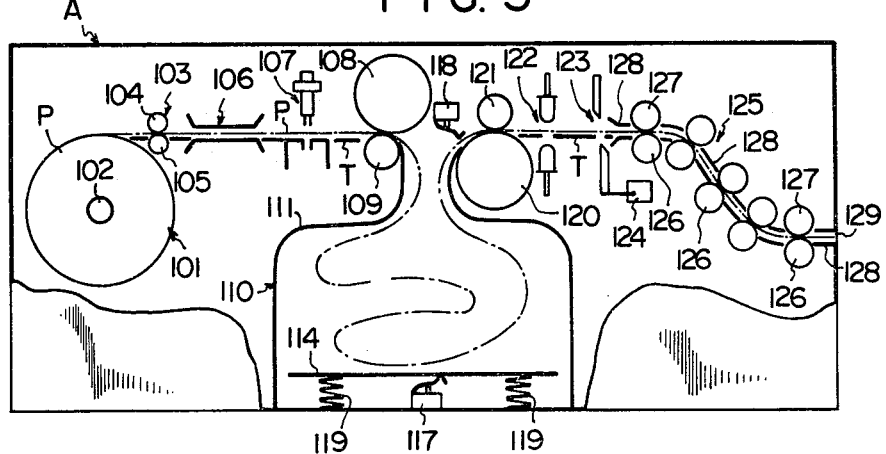
FIG. 3 is an enlarged diagramatic view showing a portion of the printer of FIG. 2, as seen in the same direction as FIG. 1.

FIG. 2 is a diagramatic view showing a photographic processing machine into which the printer of the present invention is installed, and FIG. 3 is a diagramatic view showing only the printer, both of which are viewed in the same manner as that of FIG. 1. And in this FIG. 2, A is a printer, B is a feeding device for feeding a separate sheet-form photographic paper cut to a size corresponding to a frame of a film after a printing operation in the printer A and forwarded to the feeding device, and C is an automatic developing device. P is a long photographic paper wound in a roll form, and is the same as the long photographic paper $P_1$ of FIG. 1. S is a stroke for transferring the photographic paper P.

In FIG. 3 the elements which correspond structurally and functionally to those shown in FIG. 1 have been identified with the same reference numerals, but as part of a "100" series of identifying numbers. Thus, the charging member 101, charging shaft 102, photographic pay-out member 103 comprising pay-out rollers 104 and 105, printing member 106, punching member 107, photographic paper tension roller 108, idler roller 109, take-out roller 120, idler roller 121, punching hole member 122, cutting member 123, limit switch 124, forwarding member 125 constituted by the plurality of rollers 126 and 127, guide plates 128 and opening 129 correspond to these same structures which are identified in FIG. 1 without the "100" series numbers, and further detailed descriptions of these elements with respect to FIG. 3 are not necessary. Similarly, the roll of photographic paper P and the base plate T shown in FIG. 3 correspond structurally and functionally to the photographic paper $P_1$ and base plate $T_1$ shown in FIG. 1. The construction of the photographic paper accumulator 110 in the printer A of the present invention which differs from the accumulator 10 shown in the known printer $A_1$ is described below.

The photographic paper accumulator 110 in the printer A of this embodiment is comprised as its major components of a casing 111 provided with an opening for use in supplying and receiving the photographic paper P at the upper portion thereof, a movable plate 114 supported by springs 119 so as to form a bottom of the casing 111, which permits the photographic paper P supplied to the casing 111 to be laid in random loop form without having any restriction or external forces imposed thereon, to compress the springs 119 by the volume of the laid photographic paper and to enable up and down movement of the plate. An upper limit switch 117 operates to terminate a photographic paper paying-out operation of the pay-out rollers 104 and 105 at said photographic paper pay-out member 103, a printing operation at a printing member 106, and a punching operation at the punching member 107 only when a great amount of photographic paper P supplied to the casing 111 by a photographic paper tension roller 108 and an idler roller 109 cooperating with the roller 108 compresses the springs 119, causing the movable plate 114 to descend and contact the upper limit switch 117 a lower limit switch 118 operates to terminate a take-out operation of said photographic paper take-out roller 120 and at the same time to terminate each of the operations at said punched hole sensing member 112 and the photographic paper cutting member 123 only when the volume of the photographic paper P supplied to the casing 111 has decreased to cause a direct contact of the photographic paper P therewith and this contacting pressure cuases an operation thereof.

When a photographic processing machine in which a printer A provided with a photographic paper accumulator as described above, a feeding device B for feeding a sheet-form photographic paper and an automatic developing device C are arranged in this order is to be used, a long photographic paper P wound in a roll form is charged at a charging portion 101 of the printer A, a leading end of the photographic paper is pulled out along the base plate T provided with a transferring guide passage, passed between each of the rollers of the pay-out member 103 for a specified length of the photographic paper, via the printing member 106, the punching member 107, further between the photographic paper tension roller 108 and the idler roller 109 and then between the photographic paper take-out roller 120 and idler roller 121. And when a starting operation is performed by a previously connected power supply in the same manner as that of the conventional kind of this photographic processing machine, a series of processing operations from a printing on the photographic paper P to a developing therefor may be performed continuously. In this case, in the printer A, each of the operations of an intermittent pay-out of a specified length of a photographic paper P, printing on the photographic paper, punching a hole, storing in the photographic paper accumulator 110, sensing the punched hole, cutting and forwarding of the photographic paper, etc., is performed. Each of these operations is controlled by the volume of photographic paper P stored in the photographic paper accumulator 110, in other words, by the upper limit switch 117 and the lower limit switch 118. This control will accommodate the difference between the processing capacity of the printer A which has a relatively high processing capability and the processing capacity of the automatic developing machine C which has a relatively low processing capability.

In the photographic paper accumulator 110, the photographic paper P is stored in naturally-formed loops, without being subjected to any external forces, so that no strains are produced in the photographic paper P which will cause curling of the paper. As noted above, the curling of the exposed photographic paper results primarily from the zig-zag passage of the roll of photographic paper through the printer via the series of guide rollers, and the subsequent cutting of the tensioned paper to the appropriate print size. Thus, the problems associated with the prior-art printers, in which the zig-zag passage of the tensioned, cut exposed or printed photographic paper through the printer and the automatic developing machine results in the curling of the paper, which in turn adversely affects the development of the exposed photographic paper and results in the deterioration of the performance of the developing machine and the quality of the developed prints.

As is apparent from the foregoing description, when a new roll of photographic paper P is charged in the printer A and the printer is operated, there are no guide rollers in the photographic paper accumulator 110 in the printer A, which eliminates the troublesome operation of applying the photographic paper over the guide rollers to provide for easy handling of the paper, and at the same time reduces the length of the leading end of the photographic paper P which has to be threaded through the printer. Furthermore, when a printing operation has been completed in the series of operations involved in the operation of the automatic photographic processing machine, the control switches associated with each operation step are operated to minimize the length of photographic paper P stored within the accumulator 110 and to reduce the amount of wasted paper when the printer operation is restarted.

As apparent from the foregoing description, the printer of the present invention achieves the objects of the present invention, removes some of the inconveniences and resolves the disadvantges associated with the conventional type of printer.

In the embodiment used in illustrating the printer A of the present invention, it is apparent that while the photographic paper accumulator is installed in an upward direction, various modifications may be made by those skilled in the art without departing from the spirit of the present invention as defined in the claim, since the accumulator may be installed in a downward direction and installed at an upper part between the tension roller 108 and the idler roller 121.

What is claimed is:

1. In combination with a photographic printer having a charging member for receiving a length of photographic paper, a pay-out assembly for intermittently paying-out a specified length of the photographic paper, a printing means for controllably exposing the photographic paper after movement of the paper by the pay-out assembly has stopped, a punching member operatively controlled by operation of the printing means to punch a hole at a predetermined location on the photographic paper, roller means for passing the photographic paper through the printer, removal means, including a take-out roller, for transporting said specific length of paper in response to the time required for a treatment of said photographic paper exteriorly of the printer, sensing means for sensing a hole punched in said paper to control the operation of said take-out roller, a cutting assembly responsive to said sensing means to cut a length of said photographic paper, and an assembly for removing the cut paper from the printer, a photographic paper accumulator comprising:

a casing disposed within said printer for receiving a length of the photographic paper in randomly-formed loops, said loops not being subjected to external forces;

a biased plate disposed within said casing for supporting the loops of photographic paper, said plate movable in responsive to the quantity of paper within said casing;

a first switch located within said casing and responsive to a first position of said biased plate to control selected operations of said printer; and a second switch located within said casing and responsive to a position of said paper within said casing to control a second set of selected operations of said printer, said paper accumulator storing a length of photographic paper within said printer without subjecting said paper to stress or strain, and said first and second switches responsive to the position of said biased plate and the length of paper within the accumulator to control printer operation in response to the time required by another processing procedure performed on said photographic paper exteriorly of the printer.

2. The combination of claim 1, wherein said movable plate is biased by a spring, the value of the biasing force of said spring being related to a predetermined length of photographic paper within said casing.

3. The combination of claim 1, wherein said first switch is located in a position determined by a predetermined maximum length of photographic paper within said casing.

4. The combination of claim 3, wherein said selected printed operations controlled by said first switch determine the quantity of photographic paper supplied to said casing, including operations of said pay-out assembly, said printing means, and said punching member.

5. The combination of claim 1, wherein said second switch is located at a position to be contacted by said photographic paper when a predetermined minimum length of said paper is disposed within said casing.

6. The combination of claim 5, wherein said second set of selected printer operatins determine the quantity of photographic paper removed from the printer, including operation of said take-out roller.

7. The combination of claim 1, further including:

an automatic photographic developing device for receiving cut photographic paper and effecting a developing treatment on said paper; and a feeding device operatively connected to said printer and said developing device for receiving cut photographic paper from said printer for supplying said paper to said developing unit, said printer, feeding device and said developing unit cooperatively functioning to effect a series of photographic processing procedures.

* * * * *

UNITED STATES PATENT AND TRADEMARK OFFICE
CERTIFICATE OF CORRECTION

PATENT NO. : 4,136,946
DATED : January 30, 1979
INVENTOR(S) : Kanichi Nishimoto

It is certified that error appears in the above-identified patent and that said Letters Patent are hereby corrected as shown below:

Column 1, lines 9-11 should read as follows:

-- corresponding to a frame of a film after printing and fed as a sheet-form photographic paper for additional processing. More particularly this invention provides --.

Column 5, line 35, "numberals" should read -- numerals --.

Column 8, line 43, "operatins" should read -- operations --.

Signed and Sealed this

Thirty-first Day of July 1979

[SEAL]

Attest:

Attesting Officer

LUTRELLE F. PARKER
Acting Commissioner of Patents and Trademarks